Patented Nov. 1, 1949

2,486,839

UNITED STATES PATENT OFFICE 2,486,839

COPOLYMERS OF VINYL ESTERS OF LOW MOLECULAR WEIGHT CARBOXYLIC ACIDS WITH POLYALKYL ESTERS OF ACONITIC ACID AND PROCESS FOR PRODUCING THE SAME

Philip L. Gordon, New York, N. Y., assignor to American Waterproofing Corporation, Brooklyn, N. Y., a corporation of New York No Drawing. Application June 28, 1945,
Serial No. 602,156

17 Claims. (Cl. 260—78.5)

This invention relates to the copolymers of vinyl esters of low molecular weight carboxylic acids with poly-alkyl esters of aconitic acid, to the methods by which they are prepared, and to the compositions containing the copolymers.

This application is a continuation-in-part of my application Serial No. 463,080, filed Oct. 23, 1942, now abandoned.

I have found that resins having new, unobvious and advantageous properties are formed by copolymerizing a vinyl ester of a low molecular weight aliphatic carboxylic acid with a poly-alkyl ester of aconitic acid. By an appropriate selection of the poly-alkyl ester of aconitic acid the compounds can be copolymerized in proportions which yield a hard, elastic, plastic and substantially colorless transparent rubbery resin especially suitable as the basic film-forming ingredient of protective coating compositions such as varnishes and paints.

In general, I prefer to use a vinyl ester of acetic acid as my vinyl ester although other vinyl esters such as vinyl formate, vinyl propionate, vinyl butyrate and the like may be used. By low molecular weight carboxylic acids, I mean those aliphatic carboxylic acids containing not more than six carbon atoms in the acyl radical.

Various poly-alkyl esters of aconitic acid may be used in my copolymerization process, but those containing not more than 10 carbon atoms are generally preferred. When such poly-alkyl esters are copolymerized with 2 to 7 parts by weight of vinyl acetate or with the vinyl esters of other low molecular weight aliphatic carboxylic acids a substantially transparent, colorless, elastic and plastic rubbery resin is obtained which is especially well adapted for use as the basic film-forming ingredient for protective coating compositions. When incorporating these resins in coating compositions they are sufficiently elastic and plastic not to require plasticizers. These resins may be used as such or pigments may be incorporated to form opaque coating compositions.

When less than 2 parts of vinyl ester are used the copolymers are customarily tacky and adhesive and when less than 1 part of vinyl ester is used difficulty is experienced in procuring and controlling the degree and type of polymerization. As the amount of vinyl ester is increased beyond 7 parts by weight, the copolymer normally becomes too brittle for use in coating compositions, although the resins may be used for other purposes such as in molding compositions. Generally speaking, copolymers having varying utilities may be obtained by reacting the alkyl esters of aconitic acid with about 1 to about 12 parts by weight of the vinyl esters although proportions without this range may be used under some circumstances.

The resins of this invention are generally harder and tougher than those obtained when copolymerizing like proportions of the same vinyl esters with corresponding di-alkyl esters of maleic acid.

Copolymers of mono-alkyl esters of aconitic acid with vinyl esters of low molecular weight carboxylic acid, suitable as the basic film-forming ingredient for protective coating media, have not been successfully produced by the process of this invention as described hereinafter. Moreover, such products would normally be too acidic for the stated purpose.

The copolymerization may be carried out in any suitable liquid medium. The reactants may be dissolved in suitable solvents or they may be emulsified in water. A catalyst, such as acetyl benzoyl peroxide or benzoyl peroxide, is preferably used in the copolymerization process but is not necessary. When a catalyst is not used somewhat more strenuous reaction conditions or longer periods of time must be allowed for the reaction. After the polymerization is completed the resin may be freed of the liquid carrier or the liquid content may be adjusted so that the reaction mass may be used as such.

In a special embodiment of my invention the copolymerization is carried out in the presence of a weak inert solvent which is a solvent for the copolymerization reactants but will not dissolve the copolymer after it has been formed and isolated. Such solvents may be characterized as having no "lifting" action on vinyl resin coatings, or as being compatible with, but not solvents for, highly polymerized vinyl acetate. Suitable solvents are high boiling aliphatic alcohols such as amyl alcohol, aromatic hydrocarbons such as xylol, and hydrogenated aromatic hydrocarbons such as hydrogenated aromatic solvent naphtha and the like. Those aromatic and hydrogenated aromatic hydrocarbon solvents which are generally designated as high boiling, say those boiling above about 130° C., have been found especially suitable.

When the copolymerization is carried out in the presence of the stated solvents the viscosity and the solids content of the reaction mass can readily be adjusted by the addition of more of the same or similar weak solvents. The resulting composition, since the solids are carried in a weak solvent medium, may be applied as a multiplicity of coats to a surface to be protected and the later applied coats will not swell or lift the previously applied coats.

In the examples, the proportions are expressed in parts by weight.

Example I

A solution was made consisting of the following ingredients:

| | Parts |
|---|---|
| Monomeric vinyl acetate | 35 |
| Trioctyl aconitate | 7 |
| Xylol | 10 |
| Acetyl benzoyl peroxide | 0.6 |

The solution was refluxed under atmospheric pressure until it became very viscous. Upon the addition of 50 parts by weight of xylol a solution was formed containing approximately 40% of non-volatile or solid matter which had a viscosity of approximately one poise. This solution, when brushed upon a wood or metal surface, dried to a hard glossy, flexible film in less than 2 hours. The dried film, when recoated with the same solution, formed a smooth film with no apparent lifting of the under-coat. The coating is highly resistant to the corrosive action of most chemicals.

Where an opaque coating is desired, various pigments or other colors may be incorporated in the composition.

If the reaction mass is allowed to stand or is further heated it will dry into a hard, plastic and elastic resin which is insoluble in the xylol or similar weak solvent. This resin may be solubilized, however, in strong solvents for vinyl resins such as the various low molecular alkyl ketones.

When the tri-octyl aconitate is replaced with dioctyl aconitate in this example, a product having substantially the same properties is obtained except films formed are not quite so hard and are somewhat less resistant to the corrosive action of various chemicals.

Example II

A solution was made consisting of the following ingredients:

| | Parts |
|---|---|
| Monomeric vinyl acetate | 35 |
| Tri-octyl aconitate | 25 |
| Solvesso #1 [1] | 10 |
| Benzoyl peroxide | 0.6 |

[1] A hydrogenated naphtha with a boiling range of 94–139° C.

The mixture was refluxed until viscous. This viscous solution could be used as such or slightly diluted by an addition of more of the solvent for application of a film by knife coating. The formed film is clear and sticky and possesses good adhesive properties.

Example III

A solution was made composed of the following ingredients:

| | Parts |
|---|---|
| Monomeric vinyl acetate | 35 |
| Tri-butyl aconitate | 5 |
| Xylol | 10 |
| Acetyl benzoyl peroxide | 0.6 |

The solution was refluxed until viscous. Upon an addition of xylol or hydrogenated naphtha until about 40% of non-volatile ingredients are obtained, the composition possessed an appropriate viscosity for easy application to surfaces as a protective media. After being applied, the composition dried in about 2 hours to a hard, glossy, flexible coating which completely covered the surface and formed a true continuous film thereover.

Upon reacting vinyl acetate with tri-amyl aconitate, in the proportion disclosed, a product is obtained having substantially the same properties as the copolymer of this example.

Example IV

In the preceding example, the tri-butyl aconitate was replaced by 5 parts of dibutyl aconitate. The resulting resin was somewhat lower in its resistance to the corrosive action of chemicals, slightly acidic, and not as hard as the resin made from the tri-butyl aconitate. In other properties the two resins were substantially identical and they could be used in the same fields.

Example V

A solution was made consisting of the following ingredients:

| | Parts |
|---|---|
| Monomeric vinyl acetate | 35 |
| Tridecyl aconitate | 7 |
| Xylol | 10 |
| Acetyl benzoyl peroxide | 0.6 |

The mixture was refluxed until viscous. Additional xylol was added until the solids content equaled to about 40% of the total composition. The resulting composition had a viscosity appropriate for easy application to metal, wood or other surfaces. The solution was homogeneous but slightly cloudy. When brushed upon the surface to be coated a hard, flexible film was formed that dried with a semi-gloss.

Example VI

An emulsion was formed consisting of the following ingredients:

| | Parts |
|---|---|
| Vinyl acetate | 35 |
| Triethyl aconitate | 7.5 |
| Acetyl benzoyl peroxide | 0.6 |
| Wetting agent [2] | 0.4 |
| Water | 15 |

[2] An ester of a sulfonated bicarboxylic acid known as "Aerosol OT."

The emulsion was boiled under a reflux and the copolymer precipitated out as it was formed. After substantially no further condensation took place the condenser was removed and the water boiled off at 110° C. or less. The dried resin had substantially the same properties as the films described hereinabove except that it had a somewhat lower softening point. It was insoluble in the solvents mentioned herein but soluble in true solvent for vinyl resins, such as di-methyl or methyl-ethyl ketone.

In the foregoing copolymerizations, solvents other than those specifically mentioned may be used such as Solvesso #2, which is a hydrogenated aromatic naphtha having a boiling range from 134 to 185° C. Likewise, the admixtures of this or certain of the solvents mentioned can be used in the copolymerization process.

The copolymers of my invention have many outstanding advantages, especially when used in coating compositions. Among these advantages are the exceptional toughness, hardness and chemical resistance of films made from them. When the copolymers are prepared in accordance with my preferred practice they may be readily incorporated in weak and inexpensive liquid carriers in concentrations wherein the solids content is adequate to form truly protective films and the viscosity is appropriate for easy application to the surface being protected. The fact my new copolymers may be incorporated in inexpensive solvents is of great practical importance for the solvent is lost to the surrounding atmosphere after the coating is applied and thus has no permanent effect on the nature of the coating produced.

It will be understood that the embodiments of my invention described and illustrated herein are only representative of the principles of my invention and the agents and reactants used therein. Various modifications in the illustrative embodiments of my invention can be made without departing from the spirit of the invention or its scope which is defined in the appended claims.

I claim:

1. A process for producing a liquid composition suitable as a principal film-forming ingredient in a protective coating composition consisting of dissolving 1 part of a poly-alkyl ester of aconitic acid, containing not more than 10 carbon atoms in the alkyl radical and 1 to 12 parts by weight of vinyl acetate in an inert solvent medium which is compatible with highly polymerized vinyl acetate resins but will not dissolve said resins, and copolymerizing said poly-alkyl esters and said vinyl acetate dissolved in said solvent medium by heating to copolymerization temperatures.

2. A process for producing a liquid composition suitable as a principal film-forming ingredient in a protective coating composition consisting of dissolving 1 part of a poly-alkyl ester of aconitic acid containing not more than 10 carbon atoms in the alkyl radical and 2 to 7 parts by weight of vinyl acetate in an aromatic hydrocarbon solvent boiling above about 130° C. and copolymerizing said poly-alkyl esters and said vinyl acetate dissolved in said solvent medium by heating to copolymerization temperatures.

3. A process for producing a liquid composition suitable as a principal film-forming ingredient in a protective coating composition consisting of dissolving 1 part of a poly-alkyl ester of aconitic acid containing not more then 10 carbon atoms in the alkyl radical and 2 to 7 parts by weight of vinyl acetate in xylol and copolymerizing said poly-alkyl esters and said vinyl acetate dissolved in said solvent medium by heating to copolymerization temperatures.

4. A process for producing a liquid composition suitable as a principal film-forming ingredient in a protective coating composition consisting of dissolving 1 part of a poly-alkyl ester of aconitic acid containing not more than 10 carbon atoms in the alkyl radical and 2 to 7 parts by weight of vinyl acetate in a hydrogenated solvent naphtha and copolymerizing said poly-alkyl esters and said vinyl acetate dissolved in said solvent medium by heating to copolymerization temperatures.

5. A hard, transparent, substantially colorless, elastic and plastic resinous material consisting of the copolymerization product of 1 part of a poly-alkyl ester of aconitic acid, containing not more than 10 carbon atoms in the alkyl radical, with 2 to 7 parts by weight of a vinyl ester of a saturated fatty acid of 1 to 6 carbon atoms.

6. A hard, transparent, substantially colorless, elastic and plastic resinous material consisting of the copolymerization product of 1 part of a poly-alkyl ester of aconitic acid, containing not more than 10 carbon atoms in the alkyl radical, with 2 to 7 parts by weight of vinyl acetate.

7. A liquid composition forming a plastic and elastic film comprising a resin consisting of the copolymer of 1 part of a poly-alkyl ester of aconitic acid, containing not more than 10 carbon atoms in the alkyl radical, with 2 to 7 parts of vinyl acetate incorporated in an inert solvent.

8. A process for producing a plastic and elastic material adapted for forming the base of a paint or varnish composition consisting of copolymerizing 1 part of a trialkyl ester of aconitic acid containing not more than 10 carbon atoms with 2 to 7 parts by weight of vinyl acetate by refluxing in the presence of an inert solvent medium.

9. A resinous material consisting of the copolymer of 1 part of a vinyl ester of a saturated fatty acid of 1 to 6 carbon atoms with 1 to 12 parts by weight of a poly-alkyl ester of aconitic acid containing not more than 10 carbon atoms in the alkyl radical.

10. A copolymer composed of 1 part of a poly-alkyl ester of aconitic acid containing not more than 10 carbon atoms in the alkyl radical copolymerized with 1 to 12 parts by weight of vinyl acetate.

11. A copolymer composed of 1 part of a tri-amyl ester of aconitic acid copolymerized with 1 to 12 parts by weight of vinyl acetate.

12. A copolymer composed of 1 part of a trioctyl ester of aconitic acid copolymerized with 1 to 12 parts by weight of vinyl acetate.

13. A copolymer composed of 1 part of a tributyl ester of aconitic acid copolymerized with 1 to 12 parts by weight of vinyl acetate.

14. A copolymer composed of 1 part of a trialkyl ester of aconitic acid containing not more than 10 carbon atoms in the alkyl radical copolymerized with 2 to 7 parts by weight of vinyl acetate.

15. A liquid composition of a viscosity appropriate for application as a paint and varnish and containing sufficient solids to form a truly protective coating comprising a copolymer composed of 1 part of a trialkyl ester of aconitic acid containing not more than 10 carbon atoms in the alkyl radical copolymerized with 2 to 7 parts by weight of vinyl acetate incorporated dissolved in an inert solvent.

16. A copolymer composed of 1 part of a triamyl ester of aconitic acid copolymerized with 2 to 7 parts by weight of vinyl acetate.

17. A copolymer composed of 1 part of a trioctyl ester of aconitic acid copolymerized with 2 to 7 parts by weight of vinyl acetate.

PHILIP L. GORDON.

REFERENCES CITED

The following references are of record in the file of this patent:

UNITED STATES PATENTS

| Number | Name | Date |
|---|---|---|
| 2,273,262 | Hanson et al. | Feb. 17, 1942 |
| 2,419,122 | Cox | Apr. 15, 1947 |